April 1, 1941.  G. A. HANSMAN  2,236,850
FASTENING DEVICE
Filed Oct. 21, 1939
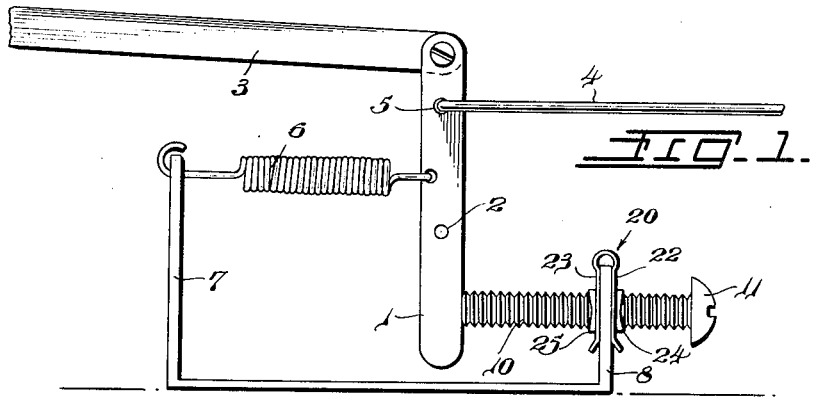
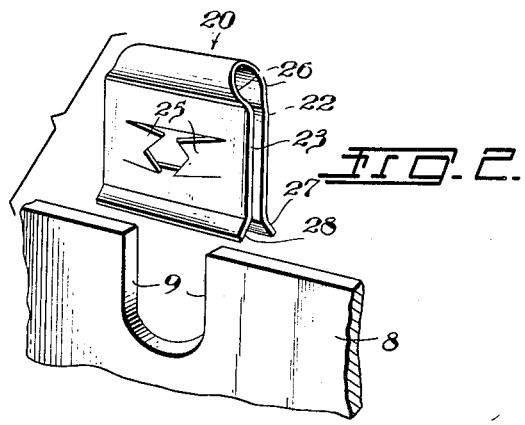
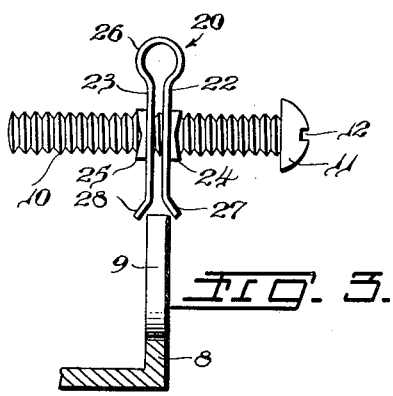
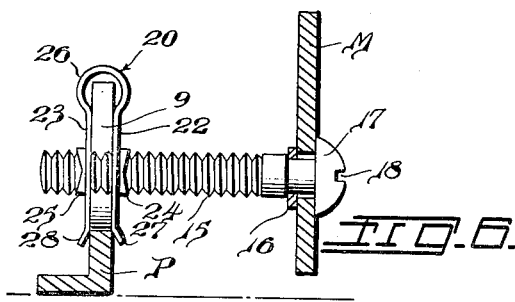
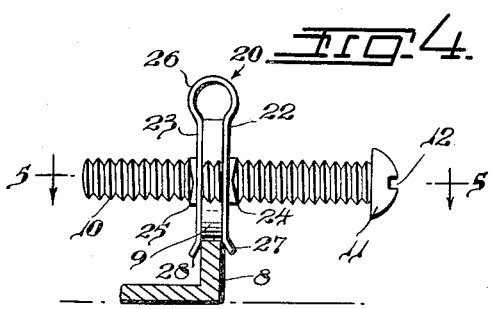
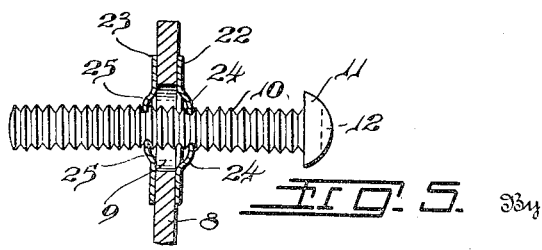
Inventor:
George A. Hansman
By H. G. Lombard,
Attorney Patented Apr. 1, 1941

2,236,850

UNITED STATES PATENT OFFICE 2,236,850

FASTENING DEVICE

George A. Hansman, Rocky River, Ohio, assignor, by mesne assignments, to Tinnerman Products, Inc., Cleveland, Ohio, a corporation of Ohio Application October 21, 1939, Serial No. 300,628

18 Claims. (Cl. 85—36)

This invention relates to improvements in fastening devices designed for use with an adjustable bolt or screw employed generally as a substantial stop device for arresting or limiting the motion of a movable element in an installation or otherwise employed as a securing means of general utility for determining the position to which a part shall be brought with respect to a cooperating part in an assembly.

More particularly, the present invention deals with the provision of a simple, inexpensive form of fastening device with which a bolt or screw fastening may be employed in the relation hereinafter specified to effect a substantial locking of the bolt or screw in adjusted position against accidental turning and unintended rotation resulting from vibration and jarring effects which ordinarily would disturb the proper setting of the bolt or screw from its desired adjusted position.

A primary object of the invention is for the provision of a fastening device of this character which dispenses entirely with the necessity for auxiliary lock nuts, lock washers, and the like, for preventing rotation of the bolt or screw in adjusted position and otherwise reduces to a minimum the time required not only for adjusting the same in a completed mounting but also, in the initial assembly thereof in an installation. In the ordinary arrangement for adjusting a bolt or screw stop device, for example, an inordinate amount of time is usually required for the several operations of first, loosening the lock nut; second, turning the screw to adjusted position; and third, tightening the lock nut in the adjusted position of the screw. In contrast, by the locking fastening device of the present invention, the bolt or screw is held in desired adjusted position under a constant spring tension which is capable of providing the desired locking effect on the bolt shank against any possible vibration, etc., yet permits the same to be readily turned under tool force for any necessary adjustment in its mounting without change whatsoever in the position of the fastening device or the attachment thereof to the part supporting the same.

Another principal object of the invention, therefore, is to provide a novel form of locking fastener for an adjustable bolt or screw comprising a substantial double nut device having substantially aligned thread engaging means designed to exert a constant spring tension on the shank of the adjustable bolt to lock the same in its applied mounted position but capable of being readily turned for easily and quickly providing any necessary adjustment thereof in such mounted position.

Still another object is for the provision of a fastening device of this character comprising a pair of superposed sections having substantially aligned thread engaging portions extending in generally opposed directions and designed to receive the bolt under ordinary thumb force for quick adjustment of the bolt with respect to the fastening device when normally untensioned, but which, when the fastening device is attached to a supporting part in an installation, provide a positive locking action with the bolt permitting the same to turn only under the force of a suitable tool for adjustment purposes.

A more specific object of the invention is to provide a sheet metal fastener of this character which may be most economically manufactured in the manner of a simple, one-piece device comprising superposed sections provided with integral thread engaging portions pressed therefrom and extending in generally opposed directions for uniformly, threadedly engaging the bolt shank at spaced points under a constant spring locking tension in the applied mounted position thereof in an installation.

Further objects and advantages, and other new and useful features in the construction, arrangement and general combination of parts of the invention will be readily apparent to those skilled in the art as a description thereof proceeds with reference to the accompanying drawing in which like reference characters designate like parts thereof throughout, and in which:

Fig. 1 represents the general organization of a control unit, for example, embodying a stop device provided by an adjustable bolt mounted in the unit by the fastening device of the present invention;

Fig. 2 is an enlarged perspective view of the fastening device showing the application thereof to the bracket or supporting part having a recessed edge portion;

Fig. 3 shows the fastening device in edge elevation with the adjustable bolt threaded therein and in position to be applied to the edge of the bracket or other supporting part, shown in section;

Fig. 4 is a view similar to Fig. 3 showing the attached position of the fastening device and the mounting of the adjustable bolt carried thereby;

Fig. 5 is a section taken on line 5—5 of Fig. 4 looking in the direction of the arrows; and, Fig. 6 shows a further embodiment of the invention in which the fastening device is employed as a retainer for a bolt securing a part with respect to a cooperating part and capable of fine, minute adjustments to vary the relative position of such parts.

The fastening device of the present invention is one of general utility so far as concerns the provision of a positive locked mounting for an adjustable bolt or screw employed as a stop device or as a means for adjustably securing a part with respect to another cooperating part in an assembly. In several of its more important uses for example, the fastening device is employed as a means for mounting a bolt serving as the adjustable stop in a number of well known forms of carburetor control units; in various automobile headlamp constructions, as a means for retaining the rods or bolts supporting the reflector within the headlamp sub-body and otherwise capable of adjustment to move the reflector as may be necessary to adjust the headlamp beam; and, in certain forms of electrical coils, as a means for adjustably mounting the metal cores therein with no material change in the usual construction, operation and use thereof, yet at a considerably reduced cost for the provision of such adjustable fastening means. This may be readily understood when it is considered, generally speaking, that, in any event, the fastening device may be constructed from a small inexpensive section of sheet metal having preferably integral thread means for threadedly engaging the adjustable bolt at spaced points under a constant spring tension which provides the desired locking action, thereby eliminating the necessity for auxiliary lock nuts and similar locking devices for preventing accidental or unintentional turning movement of the bolt from adjusted position.

Referring now, more particularly, to the drawing, Fig. 1 is intended to illustrate the general organization of a carburetor control unit, for example, embodying a stop device provided by a bolt adjustably mounted in the unit by the fastening device of the invention, indicated generally at 20. Such a unit may comprise a connecting link 1, pivotally mounted at 2 on the supporting structure and connected at one end to a lever 3 designed to actuate the operating rod 4 connected to said connecting link 1, as at 5. A coil spring 6 secured to a bracket 7 maintains said link 1 in normal position as limited by a stop provided by the shank of a bolt or screw 10 adjustably mounted in the assembly by the fastening device 20 of the present invention which is attached to a suitable bracket 8 or other supporting part in a manner presently to be described. On a free edge of said bracket 8, a hole 9 of any suitable character is provided preferably in the form of a substantial slot having a width sufficient at least to receive the shank of said bolt 10 which is secured at a point removed from the head 11 thereof having a tool recess 12 or otherwise designed to be turned by any suitable tool applied thereto for adjustment purposes.

As best seen in Figs. 2 and 3, the fastening device 20 is provided in the manner of a suitable substantial U-shape comprising a pair of arms 22, 23, provided with thread engaging means 24, 25, respectively, extending in generally opposite directions in aligned relation for receiving the bolt 10. The fastening device is constructed of any suitable sheet metal material, preferably of spring metal or of a metal having spring-like characteristics such as cold rolled steel. Said thread engaging means 24, 25 may be pressed, stamped, extruded or otherwise provided on the arms 22, 23 in any suitable form or construction so long as the same threadedly engage with the bolt threads. In this relation, the present invention fully contemplates the provision of such thread engaging means in various other related forms or in the manner of a substantial perforated hub which is pressed from the sheet metal and which is shaped to provide a helical thread or otherwise tapped to provide a plurality of threads for threadedly engaging the bolt. However, it has been found that such thread engaging means 24, 25, prepared in the form of cooperating yieldable tongues, as shown, are the most efficient and the most practical in that they are possessed of unusual inherent strength and will not collapse or pull through when the bolt is tightened therewith, nor loosen from fully tightened position under continuous strain and vibration in the installation in which the fastening device is employed. This takes place by reason of the fact that the sheet metal material from which such tongues 24, 25, are formed is of less thickness than the pitch or spacing of the threads of the bolt or screw, wherefore such tongues tend, more effectively, to move toward each other and dig into the grooves intermediate adjacent threads on the bolt when tightened therewith and otherwise become embedded in the root diameter thereof in locked, frictional fastening engagement with the bolt in applied fastening position. In the present example, such tongues are shown in Fig. 9 as of substantial ogee formation and provided preferably with notched extremities forming substantial biting jaws designed to cut into the bolt shank and adjacent thread surfaces thereon in positive locking relation therewith in the most effective manner, but it is to be understood that the present invention in no manner or form is limited to the construction shown of the thread engaging means 24, 25, but rather, comprehends also, any other specific configuration of the tongues or equivalent thread engaging elements.

The fastening device otherwise is preferably formed into a substantial loop 26 at the end in which the arms 22, 23, are connected such that said arms are disposed in substantially parallel relationship and said loop provides for any required added resilience thereof with respect to each other. In this parallel relation, said arms are untensioned and of a spacing somewhat less than the thickness of the bracket 8 or other supporting part to which they are applied to embrace the same in fully attached position; and, in order to facilitate this operation, the free ends of said arms 22, 23, are preferably fashioned in the manner of substantial lip elements 27, 28, presenting a flared entering end which permits the fastening device to be readily applied to the edge of the bracket and advanced as necessary to spread said arms 22, 23 to suitable embracing relation with said bracket.

Accordingly, the fastening device assumes the form of a substantial U-shape with the oppositely extending thread engaging means 24, 25, on the arms 22, 23, respectively, in substantial alignment for receiving and threadedly engaging the bolt 10 as shown in Fig. 3, preparatory to the application of the fastening device to attached position on the bracket 8. In this relation, the arms 22, 23 are untensioned and the oppositely extending thread engaging means 24, 25, thereon adapted to readily receive the bolt 10 threaded thereinto simply by turning with the fingers.

Thus, the bolt may be easily and quickly advanced to its approximate adjusted position relative to the fastening device prior to the time the arms 22, 23, of said fastening device are applied to embrace said bracket 8 in mounting the bolt 10 in the assembly, wherein said bolt is suitably disposed in the recess 9 provided on the edge of said bracket.

Referring to Fig. 4, it will be understood that the fastening device 20, with the bolt 10 initially threaded therein as shown in Fig. 3 to its approximate adjusted position, is readily applied over the edge of bracket 8 by means of the flared lip elements 27, 28, provided on the free ends of the arms 22, 23, thereof in substantially parallel relation. When the fastening device is moved to its final applied position shown in Fig. 4, the parallel relationship of said arms is preserved, by virtue of the resilient loop 26, as said arms spread apart to firmly and rigidly embrace the bracket in even, uniform clamping relation therewith.

In such fully attached position of the fastening device, the arms 22, 23 thereof are, of course, tensioned on being spread over the edge of the bracket 8, and this naturally causes a proportionate locking tension in the bolt thread engaging means 24, 25, carried by said arms. The pair of substantial tongues forming each of such thread engaging means 24, 25, are already in threaded engagement with the bolt threads, as aforesaid, and accordingly, when the arms 22, 23 are so spread over the bracket the extremities of the cooperating tongues on each arm tend to move inwardly toward each other as shown in Fig. 5 in biting relation with the bolt threads and otherwise become embedded in the root diameter of the bolt shank in substantially positive locked, frictional fastening engagement therewith. Thus the bolt 10 is positively engaged by said tongues 24, 25, at spaced points along the shank thereof and under constant spring locking tension at such points in a manner to lock the bolt against accidental turning and unintended rotation resulting from any vibration and jarring effects.

However, even though lockingly retained by the fastening device under such constant spring tension, the bolt 10 is capable of fine, minute adjustments in the position shown in Figs. 4 and 5 by means of a tool applied to the head thereof. This does not in any way affect the locking relation of the tongues 24, 25, of the fastening device therewith under constant spring tension and in the new setting of the bolt 10 after any such adjustment, the bolt is just as fixedly and rigidly retained as when initially mounted on the bracket 8, as aforesaid. The reason for this will be apparent when it is considered that the extremities of each pair of cooperating tongues 24, 25 are thinner than the pitch or spacing of the bolt threads and present substantial jaws having a biting relation with the bolt shank between adjacent threads and the root diameter thereof under constant spring tension in its mounted position. Consequently, when the bolt is turned for fine, minute adjustments the biting extremities of the tongues cut into the bolt shank as it is turned to its exact adjusted position and in this way positively lock the bolt against any possible accidental turning or unintended rotation in its new setting.

Fig. 6 shows a further embodiment of the invention in which the fastening device is employed as a retainer for a bolt securing a part with respect to another cooperating part but capable of fine, minute adjustments to vary the relative position of such parts as may be necessary or desirable in an assembly. In this relation, the part P may be a fixed member to which is applied the fastening 20 mounting the adjustable bolt 15, the same being substantially similar in construction, application and use to that described with reference to Figs. 1–5 inclusive with the like elements thereof being designated by like reference characters. The movable member M is mounted for adjustment toward and from the fixed part P by means of said bolt 15 which, in a preferred arrangement, is provided with a reduced neck portion on which a washer 16 is secured to bear on the face of said member M opposite to that engaged by the clamping surface of the bolt head 17. Said washer 16, may be of any selected character and secured on the bolt in any suitable manner to retain the bolt in assembled relation with said member M, so long as the bolt is rotatable in such assembled relation by means of a tool applied to the tool recess 18, for example, in the head thereof. Accordingly, in a manner similar to the previously described form of the invention, rotation of said bolt 15 provides the desired adjustment of part M toward or from part P, as the case may be, and in the final adjustment thereof, said bolt 15, is fixedly and rigidly retained in adjusted position by the spring locking action supplied by the thread engaging means 24, 25, provided on the arms 22, 23 of the sheet metal fastening device of the present invention, as aforesaid. By way of illustration, it will be readily appreciated that the foregoing arrangement of the fastening device for securing cooperating parts in adjustable spaced relation is particularly adapted for use in various ways in providing a simple, inexpensive, easily and quickly applied means for adjusting the reflectors in practically all forms of present day automobile headlight arrangements, particularly those of the built-in type directly embodied in any particular fender or body construction with the lens forming a part of the general contour thereof. In this relation, the fastening device would be attached, for example, to a bracket P, Fig. 6, within the headlight housing or subbody while the head of the bolt would be associated with the adjustable reflector M or a movable cradle therefor, as may be readily understood.

And while the invention has been described in detail with specific examples, such examples are intended as illustrations only, since it will be apparent to those skilled in the art that other modifications in the construction, arrangement and general combination of elements thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastening device comprising a section of sheet metal providing a pair of arms extending in the same general direction, threaded engaging means on each of said arms, said thread engaging means being in substantial alignment and extending in generally opposed relation from said arms for threadedly egaging a bolt or screw passed therethrough, said arms being adapted to spread apart to provide a spring locking action of said thread engaging means thereon in threaded engagement with said bolt or screw.

2. A fastening device comprising a section of sheet metal providing a pair of arms extending in the same general direction, thread engaging means on each of said arms, said thread engaging means projecting from the respective outer faces of said arms and being in substantial alignment for threadedly engaging a bolt or screw passed therethrough, said arms being adapted to spread apart to provide a spring locking action of said thread engaging means thereon in threaded engagement with said bolt or screw.

3. A fastening device comprising a pair of sheet metal arms extending in the same general direction, thread engaging means on each of said arms, said thread engaging means being in substantial alignment and extending in generally opposed relation from said arms for threadedly engaging a bolt or screw passed therethrough, said thread engaging means on each arm comprising an integral element pressed out of the plane thereof, said arms being adapted to spread apart to provide a spring locking action of said thread engaging means thereon in threaded engagement with said bolt or screw.

4. A fastening device comprising a pair of sheet metal arms extending in the same general direction, thread engaging means on each of said arms, said thread engaging means projecting from the respective outer faces of said arms and being in substantial alignment for threadedly engaging a bolt or screw passed therethrough, said thread engaging means on each arm comprising integral elements in the form of cooperating substantial tongues pressed out of the plane thereof, said arms being adapted to spread apart to provide a spring locking action of said thread engaging means thereon in threaded engagement with said bolt or screw.

5. A fastening device comprising a section of sheet metal providing a pair of spaced arms extending in the same general direction and having openings in substantial registration, means on said arms adjacent said openings in the form of bolt or screw thread engaging means, said bolt or screw thread engaging means projecting from said arms in generally opposed relation and being adapted to exert constant spring tension at spaced points on the shank of a bolt or screw passed therethrough, incident to a spreading apart of said arms to increase the spacing thereof.

6. A sheet metal fastening device comprising a pair of spaced arms extending in the same general direction and provided with openings in substantial registration, portions of said arms adjacent said openings being in the form of bolt or screw engaging means, said bolt or screw engaging means projecting from the respective outer faces of said arms and being adapted to exert constant locking tension at spaced points on the shank of a bolt or screw passed therethrough, incident to a spreading apart of said arms to increase the spacing thereof.

7. A sheet metal fastening device comprising a pair of spaced arms extending the same general direction and provided with openings in substantial registration, portions of said arms adjacent said openings being in the form of bolt or screw engaging means, said bolt or screw engaging means projecting from the respective outer faces of said arms and being adapted to exert constant locking tension at spaced points on the shank of a bolt or screw passed therethrough incident to a spreading apart of said arms to increase the spacing thereof, said bolt or screw engaging means on each arm comprising an integral element struck and formed therefrom.

8. A sheet metal fastening device comprising a pair of spaced arms extending in the same general direction and provided with openings in substantial registration, portions of said arms adjacent said openings being in the form of bolt or screw engaging means, said bolt or screw engaging means projecting from the respective outer faces of said arms and being adapted to exert constant spring locking tension at spaced points on the shank of a bolt or screw passed therethrough incident to a spreading apart of said arms to increase the spacing thereof, said bolt or screw engaging means on each arm comprising integral elements in the form of cooperating substantial tongues struck and formed therefrom to project out of the plane thereof.

9. A sheet metal fastening device comprising a pair of arms connected at one end by a substantial resilient loop and extending in the same general direction in substantially parallel relation with a spacing less than the diameter of said loop, said arms having openings in substantial registration, means adjacent said openings for engaging a bolt or screw, said means extending in generally opposed relation from said arms and being adapted to exert constant locking tension at spaced points on the shank of a bolt or screw passed therethrough incident to a spreading apart of said arms to increase the spacing thereof.

10. A sheet metal fastening device comprising a pair of arms connected at one end by a substantial resilient loop and extending in the same general direction in substantially parallel relation with a spacing less than the diameter of said loop, said arms being provided with openings in substantial registration, portions of said arms adjacent said openings being in the form of bolt or screw engaging means, said bolt or screw engaging means projecting from the respective outer faces of said arms and being adapted to exert constant spring locking tension at spaced points on the shank of a bolt or screw passed therethrough incident to a spreading apart of said arms to increase the spacing thereof.

11. A sheet metal fastening device comprising a pair of arms connected at one end by a substantial resilient loop and extending in the same general direction in substantially parallel relation with a spacing less than the diameter of said loop, said arms being provided with openings in substantial registration, portions of said arms adjacent said openings being in the form of bolt or screw engaging means, said bolt or screw engaging means projecting from the respective outer faces of said arms and being adapted to exert constant spring locking tension at spaced points on the shank of a bolt or screw passed therethrough incident to a spreading apart of said arms to increase the spacing thereof, at least one of said arms having a flared lip element provided on its free end to facilitate application of the arms of the fastening device to attached position embracing a supporting part.

12. A sheet metal fastening device comprising a pair of arms connected at one end by a substantial resilient loop and extending in the same general direction in substantially parallel relation with a spacing less than the diameter of said loop, said arms being provided with openings in substantial registration, portions of said arms adjacent said openings being in the form of bolt or screw engaging means, said bolt or screw engaging means projecting from the respective outer faces of said arms and being adapted to exert constant spring tension at spaced points on the shank of a bolt or screw passed therethrough incident to a spreading apart of said arms to increase the spacing thereof, said bolt or screw engaging means on each arm comprising integral elements in the form of cooperating substantial tongues struck and formed therefrom to project out of the plane thereof, at least one of said arms having a flared lip element on its free end to facilitate application of the arms of the fastening device to attached position embracing a supporting part.

13. A fastening device for securing a bolt or screw in an assembly, said fastening device comprising a section of sheet metal providing a pair of arms extending in the same general direction and adapted to embrace a supporting part therebetween, said arms having openings in substantial registration and carrying bolt or screw engaging means adjacent said openings, said bolt or screw engaging means being adapted to readily receive a bolt or screw passed therethrough in the normal untensioned relation of said arms, said arms being tensioned on being applied to embracing relation with the supporting part thereby providing a proportionate tension on said bolt or screw engaging means carried thereby and causing the same to effect constant locking tension on the bolt or screw in the operative position thereof.

14. A fastening device for securing a bolt or screw in an assembly, said fastening device comprising a section of sheet metal providing a pair of arms extending in the same general direction and adapted to embrace a supporting part therebetween, said arms having openings in substantial registration and carrying bolt or screw engaging means adjacent said openings, said bolt or screw engaging means projecting from the respective outer faces of said arms and being adapted to readily receive a bolt or screw passed therethrough in the normal untensioned relation of said arms, said arms being tensioned on being applied to embracing relation with the supporting part thereby providing a proportionate tension on said bolt or screw engaging means carried thereby and causing the same to effect constant locking tension on the bolt or screw in the operative position thereof.

15. A fastening device for securing a bolt or screw in an assembly, said fastening device comprising a section of sheet metal providing a pair of arms extending in the same general direction and adapted to embrace a supporting part therebetween, said arms having openings in substantial registration and carrying bolt or screw engaging means adjacent said openings, said bolt or screw engaging means on each arm comprising an integral element pressed therefrom to project from the outer face thereof, said bolt or screw engaging means being adapted to readily receive a bolt or screw passed therethrough in the normal untensioned relation of said arms, said arms being tensioned on being applied to embracing relation with the supporting part thereby providing a proportionate tension on said bolt or screw engaging means carried thereby and causing the same to effect constant locking tension at spaced points on the shank of the bolt or screw in the operative position thereof.

16. A fastening device for securing a bolt or screw in an assembly, said fastening device comprising a section of sheet metal providing a pair of arms extending in the same general direction and adapted to embrace a supporting part therebetween, said arms having openings in substantial registration and carrying bolt or screw engaging means adjacent said openings, said bolt or screw engaging means on each arm comprising integral cooperating substantial tongues pressed therefrom to project from the outer face thereof, said cooperating tongues on each arm being adapted to readily receive a bolt or screw passed therethrough in the normal untensioned relation of said arms, said arms being tensioned on being applied to embracing relation with the supporting part thereby providing a proportionate tension on said cooperating tongues carried thereby and causing said tongues to effect constant locking tension at spaced points on the shank of the bolt or screw in the operative position thereof.

17. A fastening device for securing a bolt or screw in an assembly, said fastening device comprising a section of sheet metal providing a pair of arms connected by a substantial resilient loop and extending in the same general direction in substantially parallel relation, said arms being adapted to embrace a supporting part therebetween and having openings in substantial registration, bolt or screw engaging means adjacent the opening in each arm comprising an integral element pressed therefrom to project from the outer face thereof, said bolt or screw engaging means being adapted to readily receive a bolt or screw passed therethrough in the normal untensioned relation of said arms, said arms being tensioned on being applied to embracing relation with the supporting part thereby providing a proportionate tension on said bolt or screw engaging means thereon and causing the same to effect constant locking tension at spaced points on the shank of the bolt or screw in the operative position thereof.

18. A fastening device for securing a bolt or screw in an assembly, said fastening device comprising a section of sheet metal providing a pair of arms connected by a substantial resilient loop and extending in the same general direction in substantially parallel relation, said arms being adapted to embrace a supporting part therebetween and having openings in substantial registration, bolt or screw engaging means adjacent the opening in each arm comprising integral cooperating substantial tongues pressed therefrom to project from the outer face thereof, said bolt or screw engaging means being adapted to readily receive a bolt or screw passed therethrough in the normal untensioned relation of said arms, said arms being tensioned on being applied to embracing relation with the supporting part thereby providing a proportionate tension on said cooperating tongues carried thereby and causing the same to effect constant locking tension at spaced points on the shank of the bolt or screw in the operative position thereof on said supporting part, at least one of said arms having its free end provided with a flared lip element facilitating application of the arms of the fastening device to embracing relation with the supporting part.

GEORGE A. HANSMAN.